(12) United States Patent
Oh et al.

(10) Patent No.: US 11,572,098 B2
(45) Date of Patent: Feb. 7, 2023

(54) HITCH ANGLE DETECTION USING AUTOMOTIVE RADAR

(71) Applicant: Ford Global Technologies, LLC, Dearborn, MI (US)

(72) Inventors: Jinhyoung Oh, Union City, CA (US); Daniel R. Fuhrmann, Houghton, MI (US); Kunle T. Olutomilayo, Hancock, MI (US); Saeid Nooshabadi, Gilroy, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 385 days.

(21) Appl. No.: 17/010,197

(22) Filed: Sep. 2, 2020

(65) Prior Publication Data

US 2022/0063720 A1     Mar. 3, 2022

(51) Int. Cl.
*B62D 13/06*     (2006.01)
*B60D 1/06*      (2006.01)
*B60D 1/24*      (2006.01)

(52) U.S. Cl.
CPC ............. *B62D 13/06* (2013.01); *B60D 1/06* (2013.01); *B60D 1/245* (2013.01)

(58) Field of Classification Search
CPC ...... B62D 13/06; B62D 15/0285; B60D 1/06; B60D 1/245; B60D 1/62
See application file for complete search history.

(56) References Cited

U.S. PATENT DOCUMENTS

| | | |
|---|---|---|
| 6,480,104 B1 | 11/2002 | Wall et al. |
| 6,970,184 B2 | 11/2005 | Hirama et al. |
| 7,171,769 B2 | 2/2007 | Schultz et al. |
| 9,108,598 B2 | 8/2015 | Headley |
| 9,335,162 B2 | 5/2016 | Kyrtsos et al. |
| 9,499,018 B2 | 11/2016 | Gehrke et al. |
| 10,035,457 B2 | 7/2018 | Singh et al. |
| 2012/0283909 A1 | 11/2012 | Dix |
| 2013/0226390 A1 | 8/2013 | Luo et al. |
| 2014/0012465 A1 | 1/2014 | Shank et al. |
| 2014/0358417 A1 | 12/2014 | Lavoie et al. |
| 2016/0272024 A1 | 9/2016 | Bochenek et al. |

(Continued)

FOREIGN PATENT DOCUMENTS

EP    2682329 A1    1/2014

*Primary Examiner* — Sze-Hon Kong
(74) *Attorney, Agent, or Firm* — Lorne Forsythe; Price Heneveld LLP

(57) ABSTRACT

A vehicle trailer detection system includes a radar system and a controller receiving object point location data from the radar system at an increased sensitivity level, storing sequential first and second object point location data sets, and applying a rotational point set registration to the first and second object point location data sets to achieve a match between a subset of persistent point locations within the first and second object point location data sets to output an estimated rotation angle. The persistent point locations in the first and second data sets are determined to correspond with detected points on a trailer coupled with the vehicle. The controller refines the estimated rotation angle by minimizing an error in matching between the persistent point locations in the first and second object point location data sets to output a determined hitch angle between the trailer and the vehicle about a coupling point.

20 Claims, 9 Drawing Sheets

(56) References Cited

U.S. PATENT DOCUMENTS

| | | | |
|---|---|---|---|
| 2016/0288601 A1 | 10/2016 | Gehrke et al. | |
| 2016/0375831 A1 | 12/2016 | Wang et al. | |
| 2017/0334413 A1* | 11/2017 | Murakoshi | B60R 1/00 |
| 2018/0127024 A1* | 5/2018 | Pourrezaei Khaligh | B60D 1/246 |
| 2019/0084477 A1* | 3/2019 | Gomez-Mendoza | G06T 7/55 |
| 2019/0161119 A1* | 5/2019 | Greenwood | G08G 1/00 |
| 2019/0300005 A1* | 10/2019 | Di | G01S 17/931 |
| 2019/0359134 A1* | 11/2019 | Yamamoto | B62D 13/00 |
| 2020/0175709 A1* | 6/2020 | Lai | G06V 20/56 |
| 2020/0183008 A1* | 6/2020 | Chen | G01S 17/89 |
| 2020/0215992 A1* | 7/2020 | Plowman | G06T 7/579 |
| 2020/0346581 A1* | 11/2020 | Lawson | G06T 7/73 |
| 2021/0382174 A1* | 12/2021 | Chen | G05D 1/0238 |

\* cited by examiner

HITCH ANGLE DETECTION USING AUTOMOTIVE RADAR

FIELD OF THE DISCLOSURE

The present invention generally relates to a hitch angle detection process using automotive radars that, more particularly may be used in connection with steering assist technologies in vehicles, including in a trailer backup assistance system.

BACKGROUND OF THE DISCLOSURE

Reversing a vehicle while towing a trailer can be challenging for many drivers, particularly for drivers that drive with a trailer on an infrequent basis or with various types of trailers. Systems used to assist a driver with backing a trailer frequently estimate the position of the trailer relative to the vehicle with a sensor that determines a steering input for the vehicle based on an input trailer curvature path and determines a hitch angle. Both the hitch angle determination and the steering input determination require use of a kinematic model of the combined trailer and vehicle that includes both the length of the trailer, more particularly, from the point of attachment with the vehicle to the front axle thereof, and an angle between the vehicle and the trailer at that point of attachment. While some systems have relied on user input for the trailer length, doing so may place an undesired burden on the user and may introduce inaccuracies that some such systems are unequipped to handle. The accuracy and reliability of the calculations involving trailer length can be critical to the operation of the backup assist system. Accuracy of the trailer-vehicle angle (also referred to as the "hitch angle") is similarly important in determining the kinematic relationship. Accordingly, improvements related to automated system estimation of trailer length and hitch angle in an accurate manner may be desired.

SUMMARY OF THE DISCLOSURE

According to a first aspect of the present disclosure, a trailer detection system for a vehicle includes a radar system outputting object point location data to a rear of the vehicle and a controller receiving the object point location data and storing sequential first and second object point location data sets by processing the object point location data from the radar system at an increased sensitivity level relative to use of the data for vehicle detection at separate first and second instances. The controller further applies a rotational point set registration to the second object point location data sets to achieve a match between a subset of persistent point locations within the first and second object point location data sets, within a predetermined range, to output an estimated rotational angle between the first and second object point location data sets. The persistent point locations in the first and second object point location data sets are determined to correspond with detected points on a trailer coupled with the vehicle. The controller refines the estimated rotation angle by minimizing an error in matching between the persistent point locations in the first and second object point location data sets to output a determined hitch angle between the trailer and the vehicle about a coupling point.

Embodiments of the first aspect of the disclosure can include any one or a combination of the following features:
the system further includes a vehicle steering system, and the controller further controls the steering system of the vehicle using the angle of the trailer in a kinematic model of the vehicle and trailer combination to maintain the vehicle along a backing path.
the backing path corresponds with a user-commanded curvature of the vehicle and trailer.
the radar system includes a first radar unit and a second radar unit respectively mounted on a right side and a left side of a rear of the vehicle.
the controller receives the object point location data from the first and second radar units, establishes locations of the points in the object point location data within first and second coordinate systems associated respectively with the first and second radar units, and further processes the object point location data to transform the locations of the points in the object point location data within both the first and second coordinate systems into locations of the points within a third coordinate system aligned with a hitch ball of the vehicle.
the object point location data are stored respectively in the sequential first and second object point location data sets within the third coordinate system.
the first and second coordinate systems are polar arrays and the third coordinate system is a Cartesian grid, the origin of which is placed at a location that corresponds with a position of the hitch ball of the vehicle relative to the first and second radar units.
the first instance is selected to correspond with straight, forward movement of the vehicle, and the second instance is selected to correspond with reversing movement of the vehicle.
the controller continues to receive the object point location data and to store additional sequential object point location data sets in a continuous manner during continued reversing movement of the vehicle to continuously output the determined hitch angle between the trailer and the vehicle about the coupling point and uses an estimation filter to smooth variations in successive values in a continuous output of at least one of the estimated rotational angle and the determined hitch angle.
the controller further designates the second object point location data set as a reference set at a predetermined interval angle, continues to receive the object point location data and stores a sequential third object point location data set, applies the rotational point set registration to the first and third object point location data sets to achieve a match between a subset of persistent point locations within the first and third object point location data sets, within the predetermined range, to output a subsequent estimated rotational angle between the first and third object point location data sets, applies the rotational point set registration to the second and third object point location data sets to achieve a match between a subset of persistent point locations within the second and third object point location data sets, within the predetermined range, to output a shifted estimated rotational angle between the second and third object point location data sets, and if the subsequent estimated rotational angle from the first and third object point location data sets and the shifted estimated rotational angle have an absolute difference within a predetermined limit, uses an estimation filter to output a hitch angle based on the subsequent estimated rotational angle and the shifted estimated rotational angle.
ones of the point locations determined to not be persistent points within the first and second object point location data sets are considered false-positive point locations not corresponding with detected points on the trailer.

the controller limits the object point location data stored in the sequential first and second object point location data sets to object point location data within a predetermined radial distance from the coupling point.

the error in matching between the persistent point locations in the first and second object point location data sets is minimized by solving a constrained optimization problem for the persistent point locations that returns the determined hitch angle.

According to a second aspect of the present disclosure, a method for determining an angle between a connected trailer and a vehicle includes receiving object point location data to a rear of the vehicle output by a radar system of the vehicle and storing sequential first and second object point location data sets by processing the object point location data from the radar system at an increased sensitivity level relative to use of the data for vehicle detection at separate first and second instances. The method further includes applying a rotational point set registration to the second object point location data set to achieve a match between a subset of persistent point locations within the first and second object point location data sets, within a predetermined range, to output an estimated rotational angle between the first and second object point location data sets, the persistent point locations in the first and second object point location data sets are determined to correspond with detected points on a trailer coupled with the vehicle. The estimated rotation angle is refined by minimizing an error in matching between the persistent point locations in the first and second object point location data sets to output a determined hitch angle between the trailer and the vehicle about a coupling point.

Embodiments of the second aspect of the disclosure can include any one or a combination of the following features:

the object point location data is received from first and second radar units respectively mounted on a right side and a left side of a rear of the vehicle, and the method further includes establishing locations of the points in the object point location data within first and second coordinate systems associated respectively with the first and second radar units, further processing the object point location data to transform the locations of the points in the object point location data within both the first and second coordinate systems into locations of the points within a third coordinate system aligned with a hitch ball of the vehicle. and respectively storing the object point location data in the sequential first and second object point location data sets within the third coordinate system.

the first instance is selected to correspond with straight, forward movement of the vehicle, and the second instance is selected to correspond with reversing movement of the vehicle.

the method further includes continuing to receive the object point location data and to store additional sequential object point location data sets in a continuous manner during continued reversing movement of the vehicle to continuously output the determined hitch angle between the trailer and the vehicle about the coupling point.

point locations determined to not be persistent points within the first and second object point location data sets are considered false-positive point locations not corresponding with detected points on the trailer.

the object point location data stored in the sequential first and second object point location data sets are limited to object point location data within a predetermined radial distance from the coupling point.

According to a third aspect of the present disclosure, a vehicle includes a radar system outputting object point location data to a rear of the vehicle and a controller receiving the object point location data and storing sequential first and second object point location data sets by processing the object point location data from the radar system at an increased sensitivity level relative to use of the data for vehicle detection at separate first and second instances. The controller further applying a rotational point set registration to the first and second object point location data sets to achieve a match between a subset of persistent point locations within the first and second object point location data sets, within a predetermined range, to output an estimated rotational angle between the first and second object point location data sets, the persistent point locations in the first and second object point location data sets being determined to correspond with detected points on a trailer coupled with the vehicle. The estimated rotation angle is refined by minimizing an error in matching between the persistent point locations in the first and second object point location data sets to output a determined hitch angle between the trailer and the vehicle about a coupling point.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the presently disclosed device will be set forth in the detailed description which follows and will be apparent to those skilled in the art from the description, or recognized by practicing the device as described in the following description, together with the claims and appended drawings.

Figure 1:
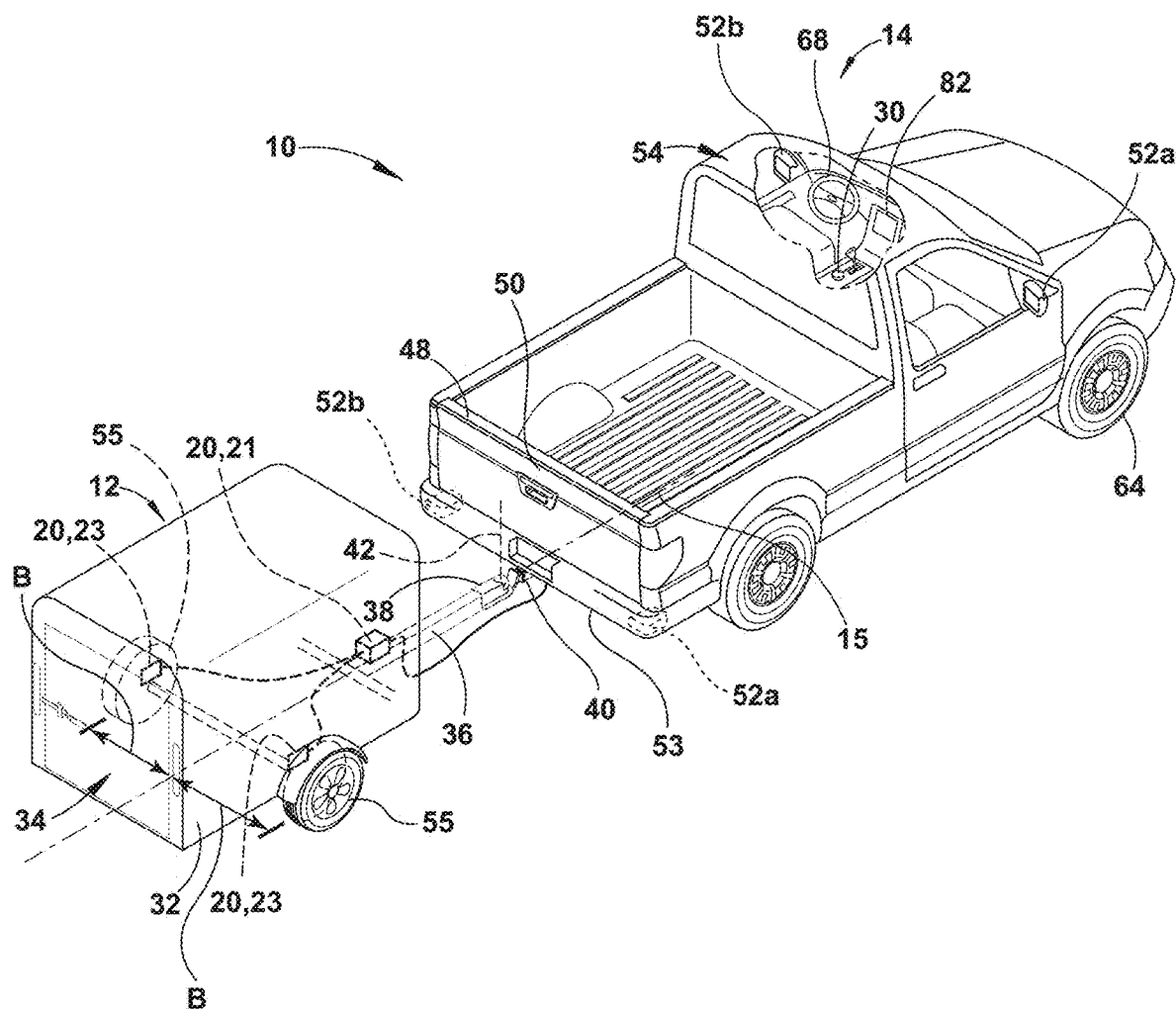
FIG. 1 is a top perspective view of a vehicle attached to a trailer.
Figure 2:
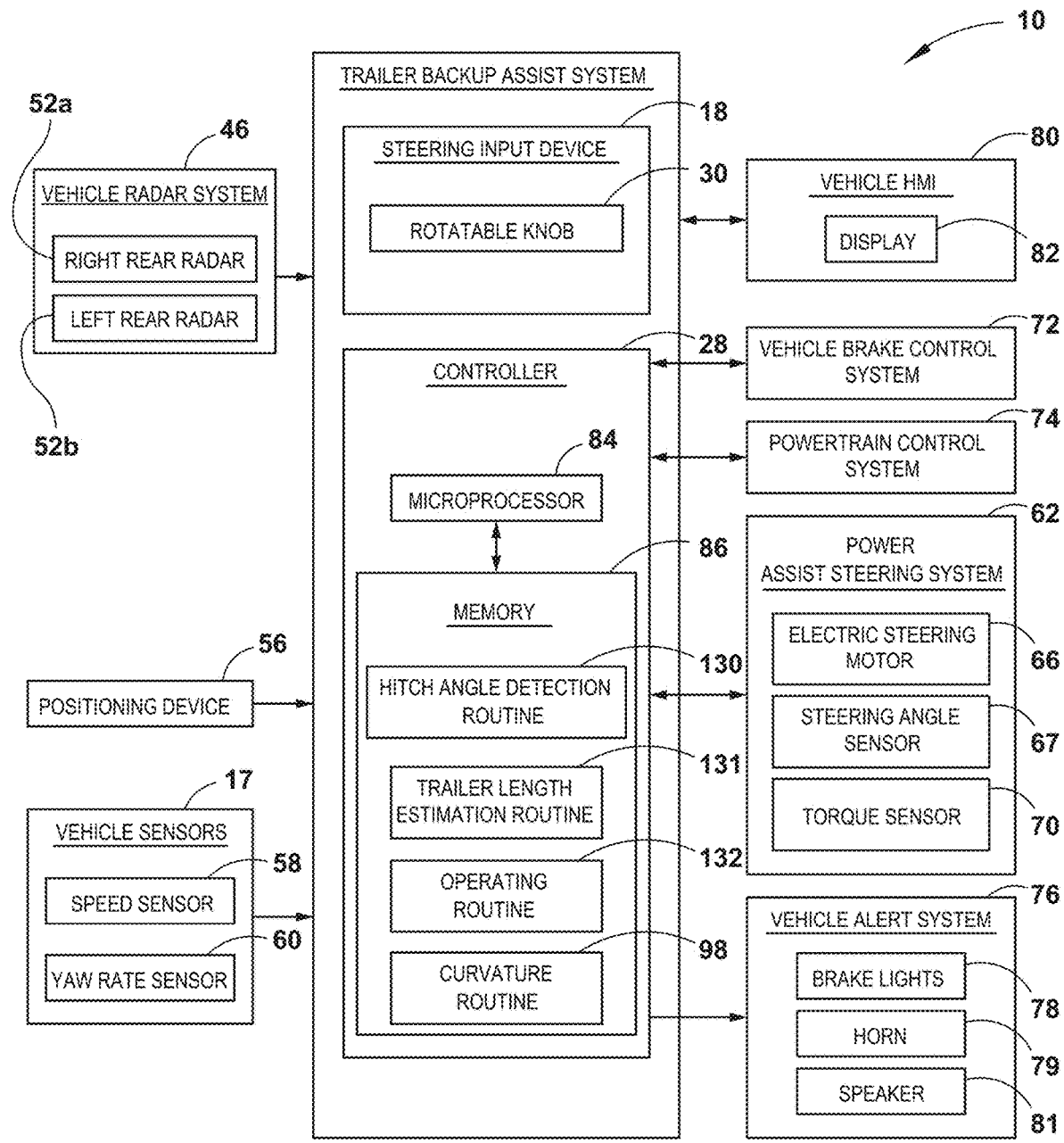
FIG. 2 is a block diagram illustrating an example vehicle control system with a radar-based trailer angle detection system according to one embodiment of the disclosure.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present application is related to U.S. patent application Ser. No. 16/671,232, filed on Nov. 1, 2019, and entitled "HITCH ANGLE DETECTION USING AUTOMOTIVE RADAR," the entire contents of which are incorporated herein by reference in its entirety.

Referring to FIGS. 1-9, reference number 10 generally refers to a trailer detection system 10 for a vehicle 14 that includes a radar system 46 outputting object point location data 88 to a rear of the vehicle 14 and a controller 28 receiving the object point location data 88 and storing sequential first and second object point location data sets by processing the object point location data 88 from the radar system 46 at an increased sensitivity level relative to use of the data for vehicle detection at separate first and second instances. The controller 28 further applies a rotational point set registration to the first and second object point location data sets to achieve a match between a subset of persistent point locations 92 within the first and second object point location data sets, within a predetermined range, to output an estimated rotational angle between the first and second object point location data sets. The persistent point locations 92 in the first and second object point location data sets are determined to correspond with detected points on a trailer 12 coupled with the vehicle 14. The controller 28 refines the estimated rotation angle by minimizing an error in matching between the persistent point locations 92 in the first and second object point location data sets to output a determined hitch angle γ between the trailer 12 and the vehicle 14 about a coupling point at connection 42.

In one example, the determined trailer angle γ and the process for the detection of the same is useable as an aspect of the system 10 that includes functionality for controlling a backing path of the trailer 12 when attached to the vehicle 14. In such an example, the system 10 can implement such control by allowing a driver of the vehicle 14 to specify a desired curvature 26 of the backing path of the trailer 12. The controller 28, in addition to determining the trailer angle γ, as discussed above, controls a steering system 62 of the vehicle 14 using the angle γ of the trailer 12 in a kinematic model of the vehicle 14 and trailer 12 combination to maintain the vehicle 14 along a backing path.

With reference to the embodiment shown in FIG. 1, the vehicle 14 may be a pickup truck that is equipped with one embodiment of the system 10 for controlling the backing path of the trailer 12 that is attached to the vehicle 14, including by continuously determining the hitch angle γ using the radar units 52a and 52b. Specifically, the vehicle 14 is pivotally attached to one embodiment of the trailer 12 that has a box frame 32 with an enclosed cargo area 34, a single axle having a right wheel assembly and a left wheel assembly, and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle γ. It should be appreciated that additional embodiments of the trailer 12 may alternatively couple with the vehicle 14 to provide a pivoting connection, such as by connecting with a fifth wheel connector. It is also contemplated that additional embodiments of the trailer may include more than one axle and may have various shapes and sizes configured for different loads and items, such as a boat trailer or a flatbed trailer.

As mentioned above and shown in FIG. 2, system 10 may also include a radar system 46 used for determining the hitch angle γ between the vehicle 14 and the trailer 12. The illustrated hitch radar system 46 employs two radar units 52a, 52b that may be located along respective sides (i.e., right and left) of vehicle 14 and may be positioned within the bumper 53 on the rear of vehicle 14 such that they are generally concealed from view. Alternatively, a single radar located centrally may be utilized. The depicted dual-side radar, however, may be preferable, as the radars 52a, 52b can act together, as described further below to provide more accurate trailer 12 point detection used in determining the hitch angle γ according to the process discussed below.

Figure 3:
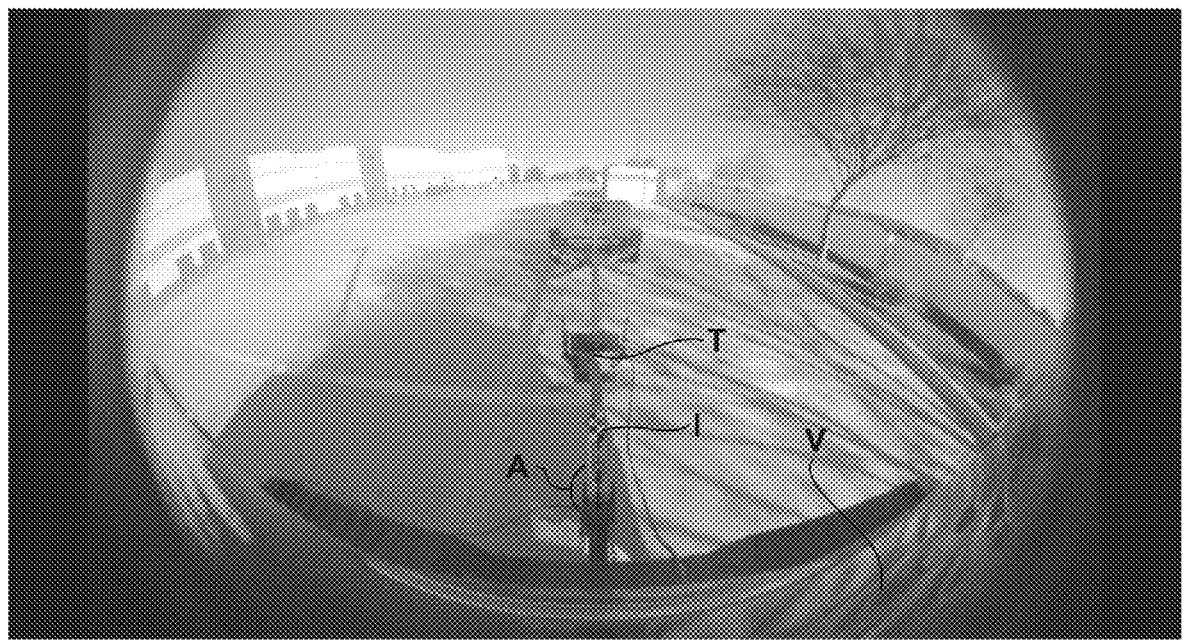
FIG. 3 is a perspective view of a related art system that uses camera image data to determine an angle of a trailer relative to a vehicle.

With reference to FIG. 3, a related art system is shown that uses computer vision techniques, such as edge 90 detection, background subtraction, and template matching to determine the position of the trailer T and/or a target image I on a specified portion of the trailer T within an image received from a camera (which can include rear camera 50, as shown in FIG. 1). The image data must then be correlated with the positioning of the camera and its attributes to arrive at positioning of the detected trailer T with respect to the vehicle to determine the hitch angle A. The utilized image processing techniques may involve multiple factors that impact the accuracy thereof in detecting the trailer T and/or target image I and correlating it to real world coordinates with reference to the vehicle V. These factors may include available ambient lighting, the presence of shadows S (as shown in FIG. 3, for example), textured surfaces, noise, and camera exposure (sensitivity or settings). These limitations may be difficult to overcome with the image processing techniques used for the utilized equipment and components. Accordingly, such systems may not provide consistent performance in generalized scenarios.

As discussed above, the present system 10 provides a hitch angle detection module 130 that uses object point data 88 obtained from the vehicle radar system 46. In the example depicted in FIGS. 1, 2, and 4, controller 28 is in communication with both the rear-right 52a and rear-left 52b radar units included within the depicted vehicle 14. In other examples, it may be possible to utilize measurements and data from a single rear-mounted radar unit. In either example, the system 10 may leverage radar units already installed in the vehicle 14, including for so-called advanced driver assistance systems ("ADAS") features or for autonomous driving systems or functionality. As shown in greater detail in FIG. 5, the hitch angle detection module 130 includes a detector block 134 that receives two object point 90 data sets to determine, essentially, a translation of certain persistent points 90p between the data sets as a rotation of the trailer. To correlate this rotation with the relative hitch angle γ the first data set is a baseline data set $X_0^r \in \mathbb{R}^{2 \times n}$ that contains detected object points 90 obtained when the trailer 12 is directly behind the vehicle 14. To populate this baseline data set, system 10 may request, for example, that the driver drive forward in a straight direction at a low speed (between 5 and 10 mph, for example). This slow forward maneuver causes the actual hitch angle γ angle to be close to zero, such that it can be consistently reasonably estimated at zero. Because the hitch angle γ can also be assumed static (by discounting minor fluctuations as insignificant over time), the straight driving maneuver also may, in one aspect ensure that the trailer 12 position relative to vehicle 14 is governed by the first-order linear ordinary differential equation:

$$\dot{\gamma} = \omega_1 - \omega_2, \quad (1)$$

where
$\omega_1$ is the vehicle yaw rate; and
$\omega_2$ is the trailer yaw rate.

Equation 1 can be rewritten according to the kinematic relationship shown in FIG. 11 (discussed further below) as:

$$\gamma = v_1 \frac{\sin\gamma}{D} - v_1 \frac{\tan\delta}{W} \frac{L\cos\gamma}{D} - v_1 \frac{\tan\delta}{W}. \quad (2)$$

When it can be inferred, such as by an acceptably low steering angle δ over time (a time-derivative of the steering angle over a predetermined interval being sufficiently close to zero), that the hitch angle γ is close to zero such that it can be determined by the linear equation (2), the controller 28 adjusts down the detection thresholds of rear radars 52a,52b (resulting in a higher sensitivity, such as about 3 dB). This is carried out because, in automotive applications the detection thresholds of radars, including rear radars 52a,52b may be optimized for detection of vehicles, people, and other objects with a generally large surface area open to vehicle 14. At such a threshold, certain features of trailer 12, which generally have a lower surface area, may not produce a sufficient number of data points 90 for use in hitch angle γ estimation using module 130. To increase the detection of object points 90 within the data set $X_0^r \in \mathbb{R}^{2 \times n}$, the controller 28 lowers the detection threshold for the data from at least rear radars 52a,52b, such as to about 3 dB, for example, to provide a sufficient number of object points 90 within the object point data 88.

Figure 6:
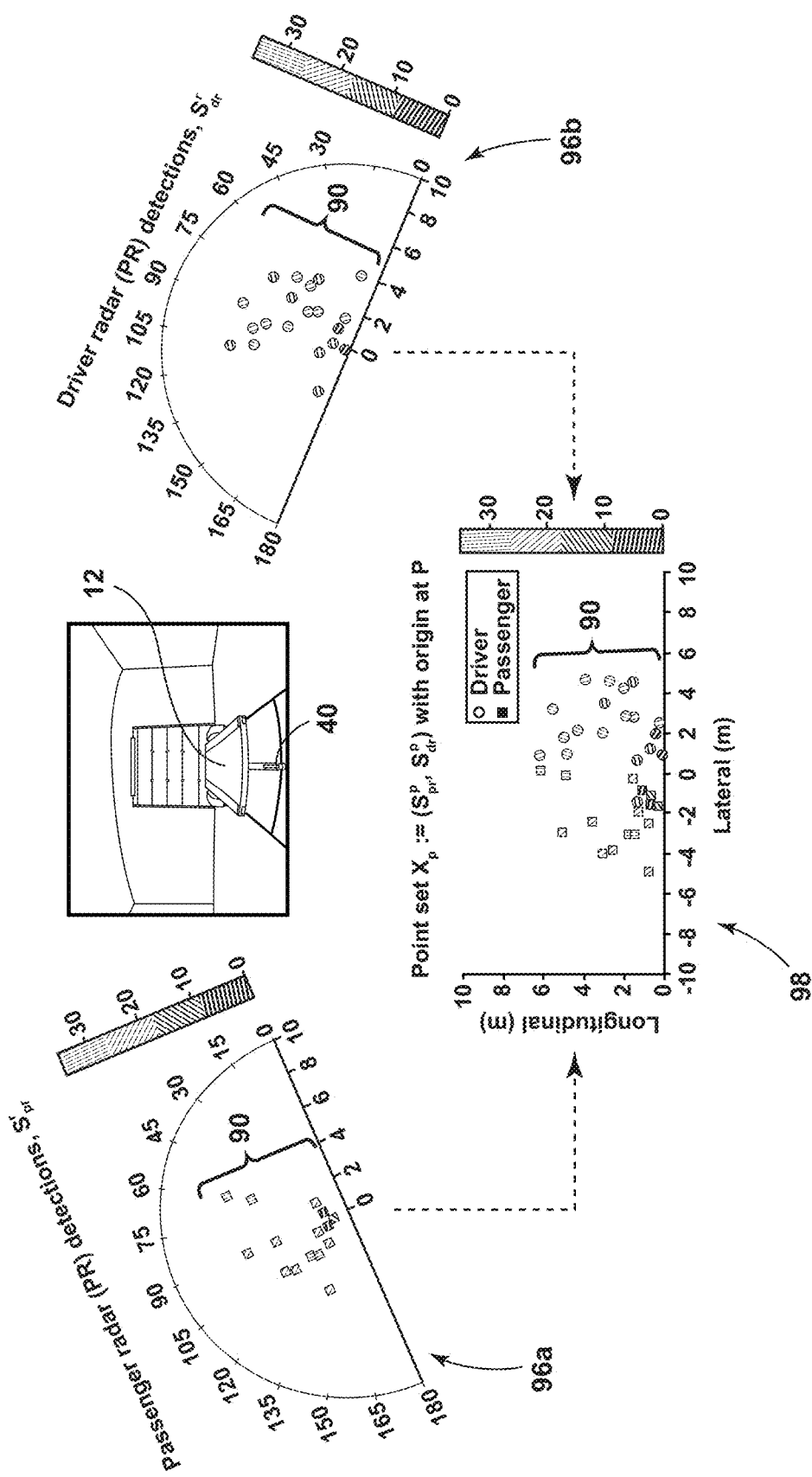
FIG. 6 is a schematic depiction high-sensitivity point detection results using vehicle radar units to establish a Cartesian baseline data set.

As can be appreciated, when the object point data 88 is initially received from the radars 52a,52b, it may be represented within polar coordinate systems 96a,96b for each of the radars 52a and 52b, respectively, as illustrated schematically in FIG. 6. Notably, these coordinate systems 96a,96b are centered about origins that are aligned with the respective radar units 52a and 52b. Accordingly, as an initial step (in block 140), the object points 90 of the separate polar coordinate systems 96a and 96b can be transformed into a single Cartesian coordinate system 98 with its origin at the pivot point P of trailer 12, which is aligned with the hitch ball 40 of vehicle 14. In general, a rotation matrix at an angle σ (rotating a vector counter-clockwise for positive a-values) is as follows:

$$Q_{(\sigma)} = \begin{bmatrix} \cos(\sigma) & -\sin(\sigma) \\ \sin(\sigma) & \cos(\sigma) \end{bmatrix} \quad (3)$$

Figure 4:
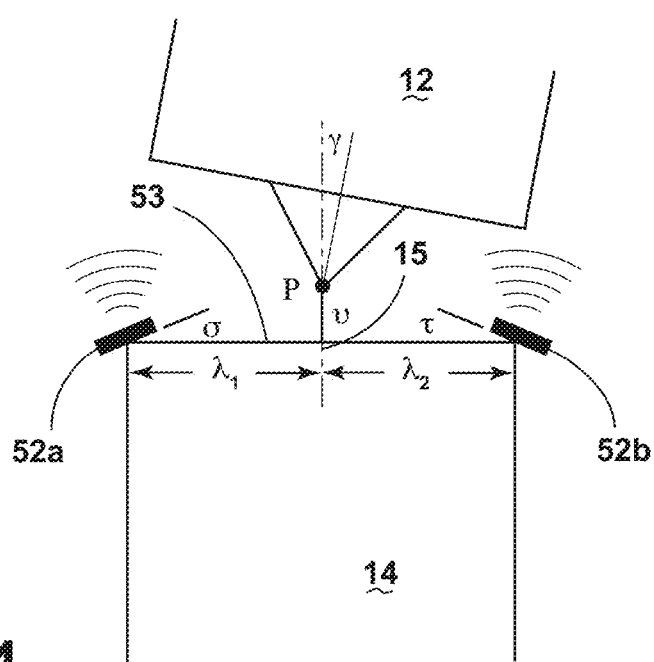
FIG. 4 is an overhead schematic view of geometric parameters of the vehicle including the system of FIG. 2.

The object points 88 in the polar systems 96a and 96b from the radars 52a and 52b can be represented as range azimuth coordinates $S_{pr}^r$ and $S_{dr}^r$, respectively, wherein $\acute{S}_{pr}^r$ and $\acute{S}_{dr}^r$ are the Cartesian coordinates thereof, respectively. These coordinates can be related to the transformed coordinates in the Cartesian system 98, respectively $S_{pr}^P$ and $S_{dr}^P$, by the following equations:

$$S_{pr}^P = Q_{(\sigma)} \acute{S}_{pr}^r - \begin{bmatrix} \lambda_1 \\ v \end{bmatrix} 1^T, \text{ and} \quad (4)$$

$$S_{dr}^P = Q_{(\tau)}^T \acute{S}_{pr}^r - \begin{bmatrix} -\lambda_2 \\ v \end{bmatrix} 1^T \quad (5)$$

in which $1^T$ is a row vector of 1's of an appropriate size, and
where (as shown in FIG. 4):
σ is the angle of radar unit 52a relative to the rear bumper 24;
τ is the angle of radar unit 52b relative to the rear bumper 24;
$\lambda_1$ is the lateral distance between radar unit 52a and the centerline 15 of vehicle (along which the hitch ball 40 is positioned);
$\lambda_2$ is the lateral distance between radar unit 52a and the centerline 15 of vehicle (along which the hitch ball 40 is positioned); and
v is the distance, along centerline 15, of the hitch ball 40 from the lateral line connecting the radars.

Accordingly, the data in the form of the object detection points 90 from radars 52a and 52b, taken when the trailer 12 is known to be in a position corresponding to a hitch angle γ of zero can be designated as the set $X^P := (S_{pr}^P, S_{dr}^P)$, including a combination of the transformed object points 90 in the Cartesian system 98, as shown in the example of FIG. 6. Once the zero-angle data set $X^P$ is stored in memory 86, the controller 28 can continue to receive the radar data for processing at the same reduced threshold (e.g., 3 dB) in an ongoing manner to make a discrete or continuous determination of the hitch angle γ by a comparison of subsequent object point data 88 from radars 52a,52b. In various examples, the hitch angle γ, determined according to the process discussed in detail below, can be used in connection with various vehicle monitoring or control systems/processes, including but not limited to, various trailer sway monitoring systems, feedback-based trailer braking control systems, trailer backup assist systems (such as system 10 in FIG. 1, the use of which is discussed further below with respect to FIG. 11), and the like. For use of the hitch angle γ in connection with such systems and processes using module 130 of FIG. 5, the stored data set $X^P$ can be retrieved from memory 86 upon activation of such a system (e.g., upon activation of system 10) in situations where it can be assumed that the same trailer 12 is connected with vehicle 14, for example, including when vehicle 14 has not been subsequently turned off or when system 10 can otherwise confirm that the same trailer for which the zero-angle data set r was obtained is still connected (e.g. by user confirmation, user selection of a connected trailer from a list stored in memory 86, or the like). The subsequent object point data 88 received from radars 52a,52b can be compared against the known zero angle data set r to determine a current, or instantaneous hitch angle γ for trailer 12.

Figure 7:
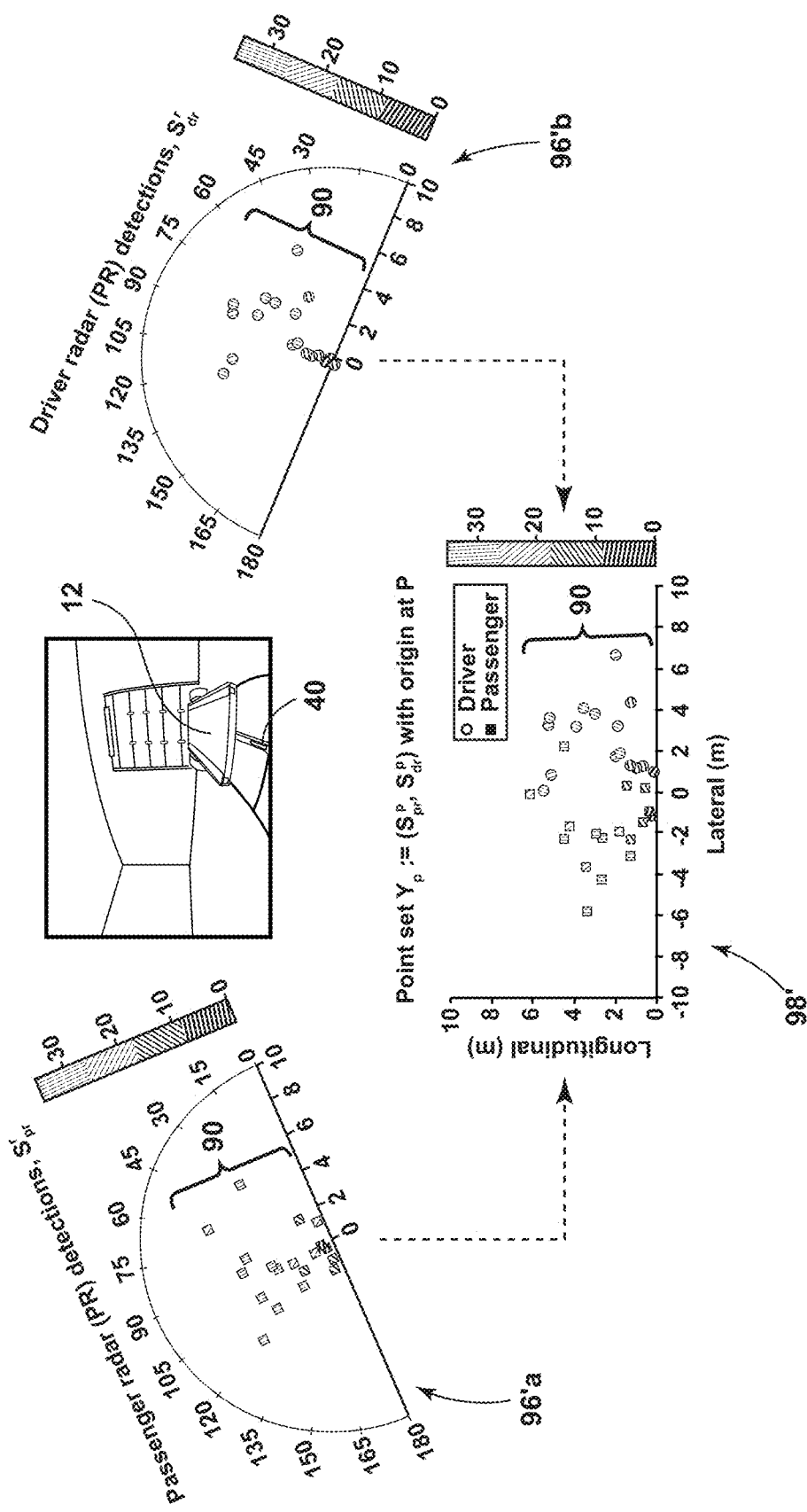
FIG. 7 is a schematic depiction high-sensitivity point detection results using vehicle radar units to establish a Cartesian data set for measurement by rotational matching with the baseline data set.

With reference to FIG. 7, the set of object point data 88 obtained from, for example, a most-recent scan by radars 52a,52b can be designated as $Y^r \in \mathbb{R}^{2 \times m}$ and, in a similar manner to the initial data set $X_0^r$, is received as object points 90 in polar coordinate sets 96a' and 96b' emanating from respective origins aligned with the radars 52a and 52b such that $Y^r=(S_{pr}^r, S_{dr}^r)$. The object points 90 in the separate sets 96*a'* and 96*b'* can, thusly, be transformed into the single Cartesian set 98' of object points 90 with the origin P aligned with the trailer 12 pivot point about hitch ball 40 using equations 4 and 5, above, such that $Y^P:=(S_{pr}^P, S_{dr}^P)$.

Because the range of the radars 52*a* and 52*b* may exceed the length of trailer 12 (and/or the length of the portion of trailer needed to make a determination of the hitch angle γ according to the process discussed further below), the computational load needed to execute the hitch angle module 130 can be reduced by limiting the region from which the object point data 88 is processed. For example, a region of interest ("ROI") can be established within, for example, ranges [1,4]m of the hitch ball 40 (i.e., origin P of the Cartesian coordinate sets 98 and 98'). The indicated ROI discussed herein is exemplary and may correspond to a particular length of a particular trailer configuration. Other ROIs can be established for other trailer lengths and configurations and used by system 10 in various forms. For example, a correspondence table of ROIs (in the form of raw data or equations outputting an ROI for an input trailer length for a given trailer type/configuration) can be stored in memory and used for the length and configuration of the trailer 12 coupled with vehicle 14 during system 10 use (as received, by user input or user selection, for example). The object points 90 in the transformed data sets $X^P$ and $V^P$ are then checked for existence within the operative ROI. For each set $X^P$ and $Y^P$, the object points 90 found within the ROI are passed to the output of modules $X^P \to X$ and $Y^P \to Y$ for further processing. Thusly, the output sets $X \in \mathbb{R}^{2 \times n}$ and $Y \in \mathbb{R}^{2 \times m}$ respectively contain the detections found within the ROI in the baseline data set and the set for hitch angle γ determination.

Returning to FIG. 5, the transformed ROI data sets X and Y obtained from the transformation block 140 are then input to point set correspondence block 142 to derive a rotation angle $\hat{\psi}$ as an estimate used as the basis for determining hitch angle γ. As discussed above, a basic operating principle of hitch angle module 130 is the reduction in the radar detection threshold to provide a sufficient number of object points 90 for detection of trailer 12 and processing of such points to determine the hitch angle γ. It can be appreciated that the reduction of threshold is likely, given the particular operating scenario of system 10, to not only produce a number of object points 92 that correspond with points on trailer 12, but also a number of false positives 94 that do not. The points 92 that are persistent between sets X and Y, however, will reliably indicate the ones of the points 92 that correspond with the trailer 12, with the remaining points 94 being, thusly, known to be false-positive readings. By configuring point set correspondence block 142 to include the identification of persistent object points 92 across sets X and Y, the initial step of estimating hitch angle γ reduces to finding the rotational transformation of the persistent detections in the sets X and Y. This process may be considered equivalent to finding the corresponding ones of points 90 in both sets, which may be designated as 90 and 90', through point set registration.

Figure 9:
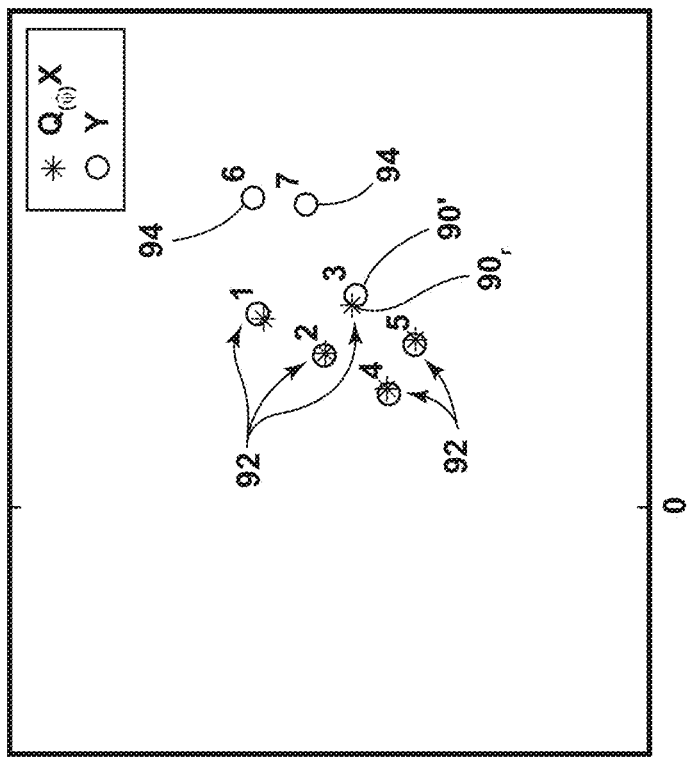
FIGS. 8 and 9 are simplified schematic depictions of rotational point set registration between the baseline data set and the data set of FIG. 7.
Figure 8:
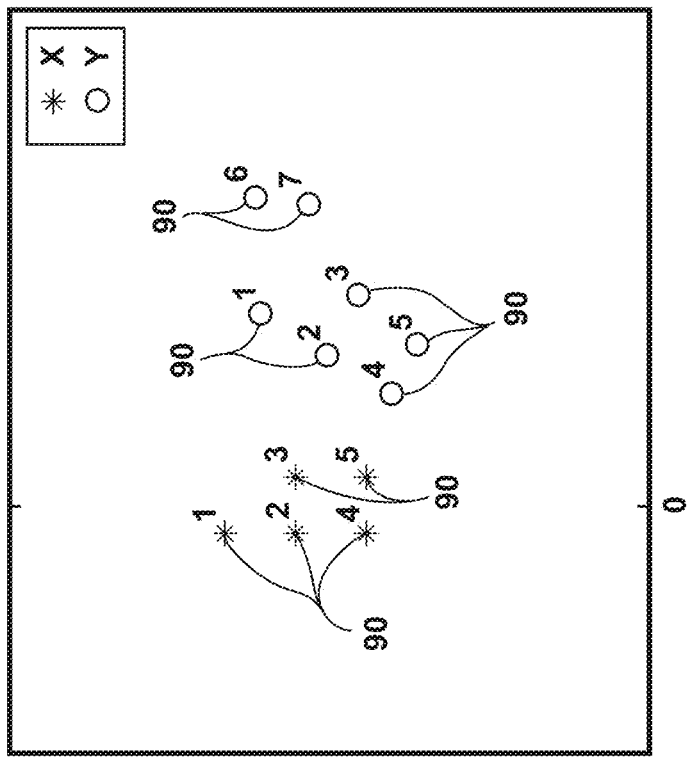

A simplified example of point set registration is shown in FIGS. 8 and 9, wherein the points 90 comprise the sets $X=(x_i)_{i=1}^n$ and $Y=(y_j)_{j=1}^m$. The data 88 consisting of the points 90 among both of these sets is processed (without considering any strength data associated with the points) based on a modified iterative closest point ("ICP") process that considers only rotation (i.e., does not consider translation) of the points 90 from set X to arrive at a closest-possible correspondence with set Y. In particular, the controller 28 in executing block 142 within module 130 searches for a rotation angle $\hat{\psi}$ that aligns the rotated set $Q_{(\hat{\psi})}X$ and Y according to the equation:

$$\hat{\psi} = \underset{\psi}{\operatorname{argmin}} \sum_{i=1}^{n} d(Q_{(\psi)}x_i, y_{nearest}), \quad (6)$$

where:
  d(•) is a distance function; and
  $y_{nearest} \in Y$ is the nearest "neighbor" to $Q_{(\psi)}x_i$ with respect to the distance function.

In particular, a Euclidian distance metric may be used in such processing such that $d(x, y):=\|x-y\|$, where $\|\cdot\|$ is the 2-norm. The search for the nearest neighbor is conducted within specified angle bounds within the processing algorithm. In one implementation, a coarse-to-fine search approach to achieve the result in equation 6 by first splitting the specified search range coarsely into number of divisions (e.g. five divisions). After identifying the initial region within the range where the minimum (in equation 6) exists, that region can be divided and the process iterated until convergence.

After obtaining the rotation angle $\hat{\psi}$, the corresponding points in the aligned sets $Q_{(\hat{\psi})}X$ and Y can be matched. Notably, alignment may not require interpretation as complete, or exact, overlapping of the points 90*r* and 90', as the detections may exhibit some degree of noise and are quantized in space (as depicted in FIG. 9). The registration may assume that two points 90*r* and 90', matched for correspondence, represent the detections from closely-located scatters on the trailer 12 in the baseline position and the position for which the hitch angle γ is to-be measured. In one example, the amount of closeness between such scatters can be defined as a basis for correspondence matching. In particular, by letting $y_{closest} \in Y$ be the nearest neighbor to the rotated point $Q_{(\hat{\psi})}x_i$, the condition:

$$d(Q_{\hat{\psi}}x_i, y_{closest}) \le r \quad (7)$$

can be used to match $(x_i, y_{closest})$ as a pair of corresponding points, where r is the radius, or scatter closeness, parameter defined within the system (e.g., configured to a particular system 10, vehicle 14, or both). If a point 90' in Y is paired in more than one instance, the block 142 may keep that point paired with the corresponding point in $Q_{(\hat{\psi})}X$ for which the distance metric is the lowest to ensure a one-to-one correspondence mapping of points. The block 142 then saves each point in each matched pair respectively in $X_c$ and $Y_c$, such that the ith points in $X_c$ and $Y_c$ have correspondence. Accordingly, if there are p unique matches, the corresponding sets output by block 142 have the same size, $X_c, Y_c \in \mathbb{R}^{2 \times p}$.

A least squares refinement (block 144) can be applied to the angle $\hat{\psi}$ obtained from equation 6 and from which the corresponding sets $X_c$ and $Y_c$ were found. In particular the refinement can be used to find the best rotational transformation from $X_c$ to $Y_c$ in the least squares sense to obtain the angle $\hat{\phi}$. This refinement can be formulated as:

$$\hat{\phi} = \underset{\phi}{\operatorname{argmin}} \|Q_{(\phi)}X_c - Y_c\|_F, \quad (8)$$

subject to:

$$Q_{(\phi)}^T Q_{(\phi)} = I, \det(Q_{(\phi)}) = +1. \quad (9)$$

where:
  $\|\cdot\|_F$ is the Frobenius norm.

Figure 5:
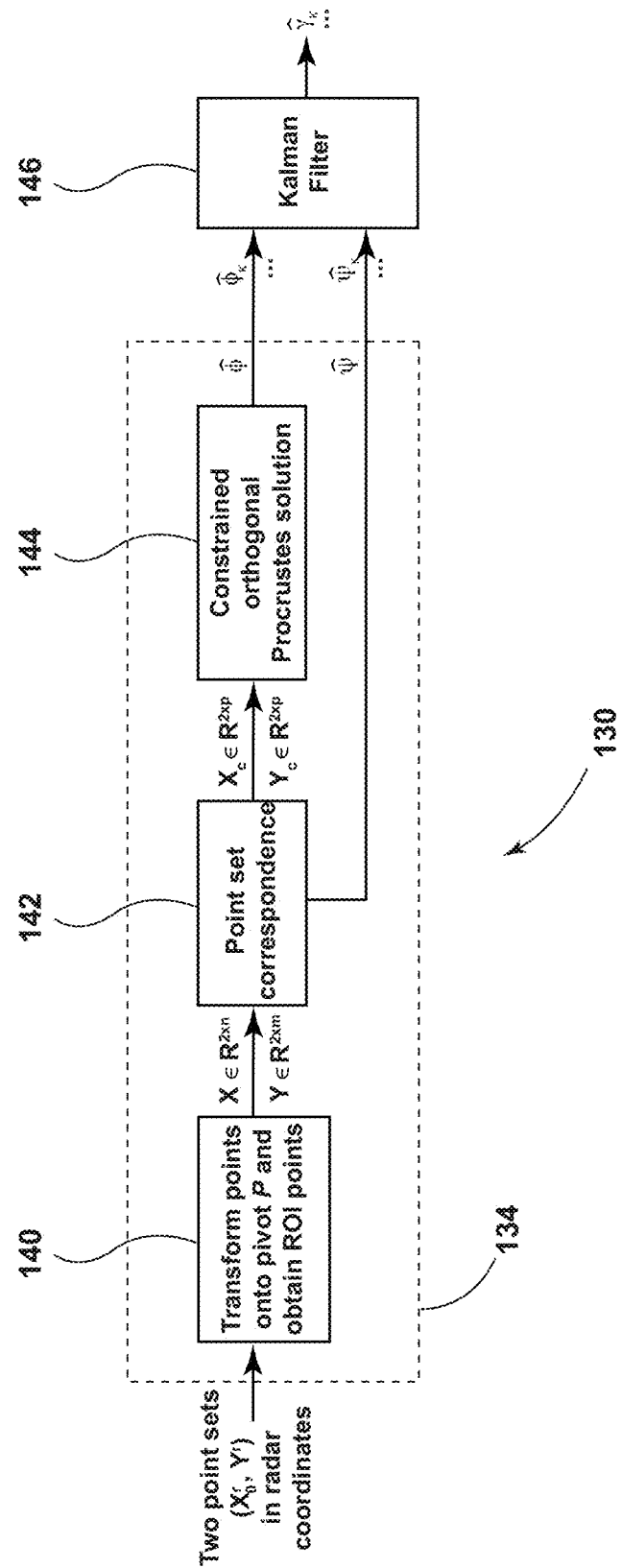
FIG. 5 is a block diagram of an implementation of the radar-based hitch angle detection module useable in the system of FIG. 2.

The constraints in equations 8 and 9 ensure that the rotation matrix $Q_{(\hat{\phi})}$ does not include reflection. The formulation may be characterized as a constrained optimization problem, such as an orthogonal Procrustes problem. The solution, which is based on the singular value decomposition ("SVD") of $Y_c X_c^T \times \mathbb{R}^{2\times 2}$, can be obtained from block 144 of module 130, as shown in FIG. 5.

Module 130 can also be configured to track the trailer 12 during rotational movement about the hitch ball 40 such that the search region used in equation 7 can be further narrowed and to prevent possible minimums outside the region. In this respect, a vector angle search range $R_s$ can be fed into block 140 as follows:

$$R_s := [-\rho, \rho], \text{ for } k=1 \tag{10}$$

$$R_s := [\hat{\phi}_{k-1}-\rho, \hat{\phi}_{k-1}+\rho], \text{ for } k>1, \tag{11}$$

where $\hat{\phi}_{k-1}$ is the most recent orthogonal Procrustes observation. The angle parameter $\delta$ may be selected based on the expected dynamics of the trailer rotation according to a particular situation and may be calibrated for a specific implementation of system 10. For example, when module 130 is used in a trailer backup assist system 10, or the like, $\delta$ may be relatively small because the trailer 12 is not expected to rotate rapidly with respect to vehicle 14, noting that too-small values for $\rho$ may result in error propagation. In various examples, $\rho$ may be greater than about 1° and may be up to about 2° or in an embodiment about 1.5°.

The results obtained from blocks 142 and 144 can be filtered in block 146 to smooth the angle estimates ($\hat{\psi}$ and $\hat{\phi}$, respectively) over time. In this context, angles $\psi$ and $\phi$ are referred to as "observations", for which a Kalman filter (or other comparable estimation filter) is a tool that can be used to estimate the state of a system using noisy observations recorded over time with respect to the system's dynamics (i.e., the rotation of trailer 12). In one aspect, errors in the observations can be assumed to be Gaussian, and a constant angular acceleration model can be used in the form:

$$\varphi = \varphi_0 + \dot{\varphi}_0 \Delta T + \frac{1}{2} a (\Delta T)^2 \tag{12}$$

$$\dot{\varphi} = \dot{\varphi}_0 + \alpha \Delta T, \tag{13}$$

where:
$\varphi_0$ and $\dot{\varphi}_0$ are, respectively, the initial angular displacement and velocity,
$\varphi$ and $\dot{\varphi}$ are, respectively, the angular displacement and velocity after the time interval $\Delta T$, and
a is the constant angular acceleration through the time interval.

In this manner, a two-element state vector can be defined as:

$$\varphi := \begin{bmatrix} \varphi \\ \dot{\varphi} \end{bmatrix} \tag{14}$$

for the angular displacement and velocity quantities. From equations 12 and 13, the linear time-invariant discrete state-space model is given as:

$$\varphi_k = A\varphi_{k-1} + Ga_{k-1} \tag{15}$$

$$y_k = C\varphi_k + v_k, \tag{16}$$

where:

$$A = \begin{bmatrix} 1 & \Delta T \\ 0 & 1 \end{bmatrix},$$

$$G = \begin{bmatrix} \frac{1}{2}(\Delta T)^2 \\ \Delta T \end{bmatrix},$$

$$y_k = \begin{bmatrix} \hat{\phi}_k \\ \hat{\psi}_k \end{bmatrix}, \text{ and}$$

$$C = \begin{bmatrix} 1 & 0 \\ 1 & 0 \end{bmatrix}.$$

In such model, equation 15 is the state transition equation and equation 16 is the measurement equation. The system is observable because the observability matrix $$\begin{bmatrix} C \\ CA \end{bmatrix}$$

is full-ranked at $\Delta T \neq 0$.

In the absence of a control input, $Ga_{k-1}$ is modeled as the process noise. The acceleration term $a_{k-1} \sim N(0, \sigma_{k-1}^2)$ so that the covariance matrix $Q_{k-1} := \text{cov}(Ga_{k-1})$ is given as:

$$Q_{k-1} = GG^T \sigma_{k-1}^2 = \begin{bmatrix} \frac{1}{4}(\Delta T)^4 & \frac{1}{2}(\Delta T)^3 \\ \frac{1}{2}(\Delta T)^3 & (\Delta T)^2 \end{bmatrix} \sigma_{k-1}^2. \tag{17}$$

Similarly, the measurement noise $v_k \sim N(0, R_k)$. The variance of the acceleration term in equation 17 can be set as $\sigma_{k-1}^2 = 1(\text{deg}/s^2)^2$ to obtain $Q_{k-1}$, $\forall k$ and estimated $R_k$ directly from observations using exponential moving average smoothing or other similar, known heuristic method.

In an implementation of filter 146, $\hat{\varphi}_{k|k-1}$ denotes the predicted state at time step k, without including the measurement at k, and $P_{k|k-1}$ is the corresponding state covariance. Additionally, $\hat{\varphi}_{k|k}$ denotes the estimated state at time step k, including the measurement at k and $P_{k|k}$ is the corresponding state covariance. With the trailer 12 assumed stationary behind vehicle 14 in which the baseline data set $X_0^r$ is obtained, the state distribution can be initialized as:

$$\hat{\varphi}_{0|0} = \begin{bmatrix} 0 \\ 0 \end{bmatrix}, P_{0|0} = \begin{bmatrix} 0.01 & 1 \\ 1 & 0.01 \end{bmatrix}.$$

In such state distribution, the diagonals of $P_{0|0}$ exhibit a high confidence regarding the initialized state, while keeping the matrix positive definite. The filter, thusly, includes two steps with equations for the time step $k \geq 1$. One step consists of a prediction step (a-priori):

$$\hat{\varphi}_{k|k-1} = A\hat{\varphi}_{k-1|k-1}$$

$$P_{k|k-1} = AP_{k-1|k-1}A^T + Q_{k-1}.$$

The remaining step consists of an update step (a-posteriori):

$$g_k = y_k - C\hat{\varphi}_{k|k-1}$$

$$S_k = CP_{k|k-1}C^T + R_k$$

$$K_k = P_{k|k-1}C^T S_k^{-1}$$

$$\hat{\varphi}_{k|k} = \hat{\varphi}_{k|k-1} + K_k g_k$$

$$P_{k|k} = (I - K_k C)P_{k|k-1},$$

where:
$\hat{\varphi}_{k|k-1}$ and $P_{k|k-1}$ are the prior state estimate and covariance, respectively,
$g_k$ is the innovation,
$S_k$ is the innovation covariance,
$K_k$ is the Kalman gain, and
$\hat{\varphi}_{k|k}$ and $P_{k|k}$ are the posterior state estimate and covariance, respectively. The $k^{th}$ Kalman filter output is:

$$\hat{\gamma}_k := [1\ 0]\hat{\varphi}_{k|k}.$$

The Kalman filter output is, thusly, the determined hitch angle $\gamma$, which may be used in system 10, as discussed below or in any of the above-described variations of a vehicle 14 system that utilizes a determination of the hitch angle $\gamma$.

Figure 10:
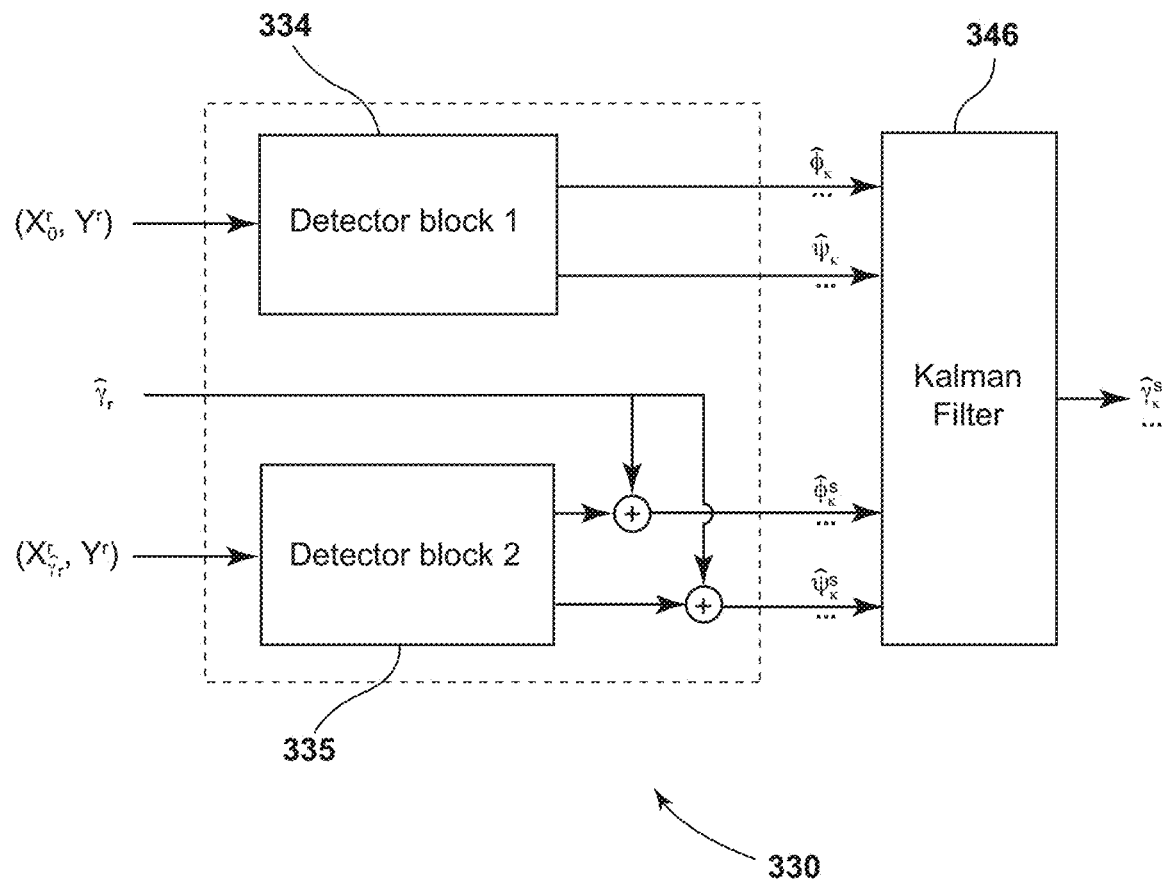
FIG. 10 is a block diagram of an alternative implementation of the radar-based hitch angle detection module useable in the system of FIG. 2.

Turning to FIG. 10, an alternative embodiment of the above-described hitch angle estimation module 330 can introduce a second detector block 335 that may be a duplicate of the detector block 334 that is generally similar to the detector block 134 discussed above with respect to FIG. 5 (including sub-blocks similar to blocks 140-144). In one aspect, the hitch angle $\gamma$ determination discussed above with respect to FIG. 5 places a heavy reliance on the baseline data set $X_0^r$. The present method reduces the reliance on the baseline data set $X_0^r$ by introducing an additional $\hat{\gamma}_r$-degree reference set $X_{\hat{\gamma}_r}^r$, which is learned or developed over time during operation of system 10, including use of the hitch angle estimation module 330. As illustrated the use of both detector blocks 334 and 335 in module 330 results in the comparison of the set $Y^r$ to both reference sets, $X_0^r$ and $X_{\hat{\gamma}_r}^r$.

As illustrated, the module 330 includes two detector blocks 334 and 335. Executing a command utilizing detector block 334 returns two observations $\hat{\phi}_k$ and $\hat{\psi}_k$ in a similar manner to detector block 134, discussed above. Executing a command utilizing detector block 335 returns shifted observations $\hat{\phi}_k^s$, and $\tilde{\psi}_k^s$. Module 330, as illustrated calls for commands utilizing both detector blocks 334 and 335 in parallel with the set $Y^r$, for which the hitch angle $\gamma$ is to be measured. The detector blocks 334 and 335, however, vary in the reference sets used. Again, detector block 334 references the baseline set $X_0^r$ (similar to detector block 334), while detector block 335 references the set $X_{\hat{\gamma}_r}^r$ such that the output of detector block 335 is not relative to the zero-degree angle, but to the reference angle $\hat{\gamma}_r$. In this manner, the incorporation of the reference angle $\gamma_r$ allows detector block 335 to make observations $\hat{\phi}_k^s$, and $\hat{\psi}_k^s$, where $\hat{\phi}_k^s$ is the shifted orthogonal Procrustes angle and $\psi_k^s$ is the shifted correspondence search angle. Together with the two observations from detector block 334, there are four observations passed to the Kalman filter 346.

Execution of the process implemented by module 330 includes producing hitch angles $\gamma$ as candidates for use as reference angles $\gamma_r$ with a reference library of reference angles and their associated sets $X_{\hat{\gamma}_r}^r$ when an estimated angle $\hat{\gamma}_k^s$ meets predefined criteria. The library may be initialized with the zero-degree reference angle and its set $X_0^r$. For each time step during use of module 330, detector blocks 334 and 335 are run with the resulting four observations passed to the Kalman filter 346 to obtain the trailer angle estimate $\hat{\gamma}_k^s$. The reference library is then updated by, first, appending the angle $\hat{\gamma}_r := \hat{\gamma}_k^s$ and the related set $X_{\hat{\gamma}_r}^r := Y^r$ in paired association to the library if $\hat{\gamma}_k^s$ is approximately a multiple of a specified angle interval parameter $\gamma_{interval}$. In one aspect, it may be determined that this condition is met by keeping track of the absolute difference of two moduli: mod $(\hat{\gamma}_{k-1}^s, \gamma_{interval})$ and mod$(\hat{\gamma}_k^s, \gamma_{interval})$ There will be a spike in the monitored data when the absolute difference of these modules matches the interval parameter. This can be interpreted as sampling the estimates around the multiples of $\gamma_{interval}$. For example, if $\gamma_{interval}=5°$, the library will be updated when $\hat{\gamma}_k^s \approx (0°, \pm 5°, \pm 10°, \dots)$.

As discussed above, system 10 obtains the zero-degree reference set $X_0^r$ during straight, forward driving of vehicle 14 towing trailer 12, including during an interval(s) when certain additional pre-conditions are met. However, during initial use of module 330, there is no prior knowledge of the reference set $X_{\hat{\gamma}_r}^r$ to be used in returning the angle estimates from block 335. Accordingly, the reference set for $X_{\hat{\gamma}_r}^r$ is selected during module 330 use. A process for selecting the appropriate reference angle and reference set $X_{\hat{\gamma}_r}^r$ can include the selection of a "candidate" angle, for which a set is available in the reference library, to be a nearest angle to the most recent hitch angle estimate $\hat{\gamma}_{k-1}^s$. In general, smaller angles are expected to include more object points 90 for the utilized rotational point set registration so selection of the closest reference angle is desired to obtain more accurate point registration. The process for detector block 335 is then run using the candidate reference angle $\hat{\gamma}_{k-1}^s$ and its associated data set $Y^r$ to obtain candidate observations $\hat{\phi}_k^s$ and $\tilde{\psi}_k^s$. The observations are then accepted if the absolute difference of the Procrustes angles $\hat{\phi}_k^s$ and $\hat{\phi}_k$ (returned from detector block 334) is either within a threshold $\gamma_{difference}$ or if the candidate angle is the zero-degree reference angle. The observations are rejected if the absolute difference of the Procrustes angles $\hat{\phi}_k^s$ and $\hat{\phi}_k$ is outside the threshold $\gamma_{difference}$. In this respect, it is noted that the reference set shifting of this use of detector block 335 may be prone to error accumulation, because the candidate reference angle $\hat{\gamma}_{k-1}^s$ is an estimate of the actual angle $\gamma$. However, the comparison of the Procrustes estimates $\hat{\phi}_k^s$ and $\hat{\phi}_k$ from both detector blocks 334 and 335 using the parameter $\gamma_{interval}$ mitigates any error accumulation effect. If the candidate reference angle $\hat{\gamma}_{k-1}^s$ is accepted, the two observations $\hat{\phi}_k^s$ and $\hat{\psi}_k^s$ are returned and input to the Kalman filter 346.

If the observations $\hat{\phi}_k^s$ and $\hat{\psi}_k^s$ obtained based on the selected candidate reference angle are rejected, the reference angle is added to a list of rejected reference angles and the same process is run with the next closest reference angle. If such additional candidate reference angles are available, other than the zero-degree reference angle, the observations are obtained and checked again according to the same criteria as the initial candidate reference angle. If the only other available reference angle is the zero-degree reference angle, the values returned for $\hat{\phi}_k^s$ and $\hat{\psi}_k^s$ will be duplicates of the angles returned from detector block 334.

Module 330 can track the trailer 12 during rotational movement about the hitch ball 40 in a similar manner to that which is discussed above with respect to module 130 to prevent possible minimums outside the region used in equation 7, above. In this respect, the vector angle search range $R_s$ fed into block 334 can be the same as set out in equations 10 and 11, above. However, the search range $R_s^s$ fed into detector block 335 can be:

$$[-\rho, \rho], \text{ for } k=1 \tag{18}$$

$$[(\hat{\phi}_{k-1}^s - \hat{\gamma}_r) - \rho, (\hat{\phi}_{k-1}^s - \hat{\gamma}_r) + \rho], \text{ for } k>1. \tag{19}$$

Similar to the process discussed above, the outputs of detector blocks 334 and 335 can be fed to a Kalman filter 346. The Kalman filter 346 can operate according to equations 12-17, as discussed above with respect to Kalman filter 146. The state-space model of equations 15 and 16 now includes four observations such that:

$$y_k = \begin{bmatrix} \hat{\phi}_k \\ \hat{\psi}_k \\ \hat{\phi}_k^s \\ \hat{\psi}_k^s \end{bmatrix}, \text{ and}$$

$$C = \begin{bmatrix} 1 & 0 \\ 1 & 0 \\ 1 & 0 \\ 1 & 0 \end{bmatrix}.$$

The $k^{th}$ Kalman filter output is:

$$\hat{\gamma}_k^s := [1 \; 0] \hat{\varphi}_{k|k}.$$

The Kalman filter output is, thusly, the determined hitch angle γ, which may be used in system 10, as discussed below or in any of the above-described variations of a vehicle 14 system that utilizes a determination of the hitch angle γ.

As discussed above, the described process for determining the hitch angle γ using the radar system 46 can, in one example, be used in connection with a system for automating or assisting in steering of the vehicle 14 during reversing of the vehicle 14 when coupled with the trailer 12. As can be appreciated, other instances exist that may utilize the measurement of the angle γ of the trailer 12 relative to the vehicle 14, including trailer sway control or monitoring systems, that have applications in other driving use cases or scenarios. When used in a trailer backup assistance system 10, the functionality described above can be incorporated into the embodiment of the trailer backup assist system 10 illustrated in FIG. 2, wherein system 10 receives vehicle and trailer status-related information from additional sensors and devices (such system also being configurable with additional functionality leveraging the detected trailer angle γ, as needed and as would be understood in such applications). The information used by the system 10 of the present example includes positioning information from a positioning device 56, which may include a global positioning system (GPS) on the vehicle 14 or a handled device, to determine a coordinate location of the vehicle 14 and the trailer 12 based on the location of the positioning device 56 with respect to the trailer 12 and/or the vehicle 14 and based on the estimated hitch angle γ. The positioning device 56 may additionally or alternatively include a dead reckoning system for determining the coordinate location of the vehicle 14 and the trailer 12 within a localized coordinate system based at least on vehicle speed, steering angle, and hitch angle γ. Other vehicle information received by the trailer backup assist system 10 may include a speed of the vehicle 14 from a speed sensor 58 and a yaw rate of the vehicle 14 from a yaw rate sensor 60. It is contemplated that in additional embodiments, the hitch angle sensor 44 and other vehicle sensors and devices may provide sensor signals or other information, such as proximity sensor signals or successive images of the trailer 12, that the controller 28 of the trailer backup assist system 10 may process with various routines to determine an indicator of the hitch angle γ, such as a range of hitch angles. Further aspects of such a system are described in detail in commonly-assigned U.S. Pat. No. 9,290,202, the entire disclosure of which is incorporated by reference herein.

Figure 11:
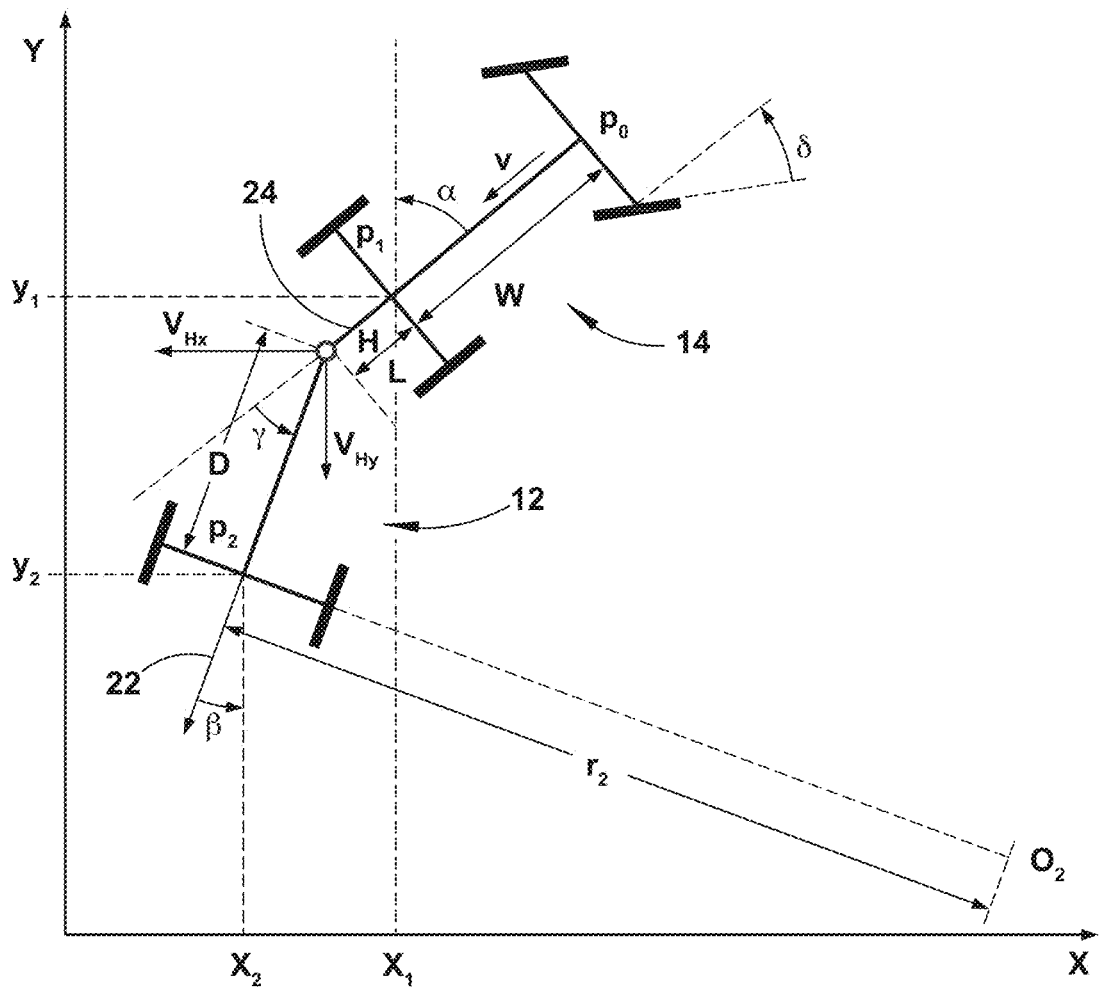
FIG. 11 is a schematic diagram that illustrates the geometry of a vehicle and a trailer overlaid with a two-dimensional x-y coordinate system, identifying variables used to determine a kinematic relationship of the vehicle and the trailer for use of the radar-based trailer angle detection system in connection with the vehicle control system, according to one embodiment of the disclosure.

With particular reference to FIG. 11, the trailer angle γ determined using radar system 46 can be used as an input to a control algorithm (e.g., curvature routine 98) that uses vehicle and trailer information and parameters to calculate a kinematic relationship between a curvature of a path of travel of the trailer 12 and the steering angle of the vehicle 14 towing the trailer 12, which can be desirable for a trailer backup assist system configured in accordance with some embodiments, including for use by a curvature routine 98 of the controller 28 in one embodiment. As shown in FIG. 11, for a system defined by a vehicle 14 and a trailer 12, the kinematic relationship is based on various parameters associated with the vehicle 14 and the trailer 12. These parameters include:

δ: steering angle at steered front wheels of the vehicle;
α: yaw angle of the vehicle;
β: yaw angle of the trailer;
γ: hitch angle (γ=β−α);
W: wheel base of the vehicle;
L: drawbar length between hitch point and rear axle of the vehicle;
D: distance (trailer length) between hitch point and axle of the trailer or effective axle for a multiple axle trailer; and
$r_2$: curvature radius for the trailer.

One embodiment of a kinematic relationship can be expressed to provide the steering angle δ as a function of trailer path curvature $\kappa_2$ and hitch angle γ.

$$\delta = \tan^{-1}\left(\frac{\left(W + \frac{KV^2}{g}\right)[\kappa_2 D \cos\gamma - \sin\gamma]}{DL_{\kappa_2}\sin\gamma + L\cos\gamma}\right) = F(\gamma, \kappa_2, K) \quad (20)$$

Accordingly, for a particular vehicle and trailer combination, certain parameters (e.g., D, W and L) of the kinematic relationship are constant and assumed known. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $\kappa_2$ can be determined from the driver input via a steering input device. As discussed above, the present example is considered non-limiting with respect to specific applications and use of the trailer angle detection system described herein. Accordingly, it would be understood that various additional applications of the system are possible. With reference to FIG. 15 a method for determining the hitch angle γ using the data obtained from radar system 46, including rear radar units 52*a*,52*b* in the present example, is depicted.

As can be appreciated by the above description with respect to FIG. 11, the illustrated hitch angle detection method can be used within a method for reversing a trailer that includes controlling the steering system 62 of the vehicle 14 using the determined hitch angle γ (i.e., the angle of the trailer 12 with respect to the vehicle 14) in the kinematic model (FIG. 11) of the vehicle 14 and trailer 12 combination to maintain the vehicle 14 along backing path. As discussed above, the method, as implemented by system 10 can begin with a request for the driver to move the vehicle forward or can otherwise begin, without indication to the user, when regular forward driving is confirmed. When such a maneuver is confirmed as being carried out, system 10 obtains the object point data 88 from the radar units 52*a* and 52*b*, and stores the data in the above-described Cartesian system 98 as the zero-angle data set $X^P:=(S_{pr}^P, S_{dr}^P)$. As discussed, the detection process includes adjusting the detection threshold used in processing the data received from radar units 52a,52b to increase the number of overall object points 90 in the data. Once the zero-angle data set is obtained, the system 10 waits for the start of a backing maneuver using controller 28. When such a process begins, system 10 uses the radar data 88 in connection with either of the above-described hitch angle modules 130 (FIG. 5) or 330 (FIG. 10) to obtain subsequent data sets $Y^P:=(S_{pr}^P, S_{dr}^P)$ and to determine the hitch angle γ, which allows for continued use of the radar data to determine the hitch angle γ on an ongoing basis during the backing maneuver, which permits reverse maneuvering of trailer 12 and vehicle 14 according to the control methodology discussed above with respect to FIG. 11 and using operating routine 132.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A trailer detection system for a vehicle, comprising:
   a radar system outputting object point location data to a rear of the vehicle; and
   a controller:
      receiving the object point location data and storing sequential first and second object point location data sets by processing the object point location data from the radar system at an increased sensitivity level relative to use of the data for vehicle detection at separate first and second instances;
      applying a rotational point set registration to the first and second object point location data sets to achieve a match between a subset of persistent point locations within the first and second object point location data sets, within a predetermined range, to output an estimated rotation angle between the first and second object point location data sets, the persistent point locations in the first and second object point location data sets being determined to correspond with detected points on a trailer coupled with the vehicle; and
      refining the estimated rotation angle by minimizing an error in matching between the persistent point locations in the first and second object point location data sets to output a determined hitch angle between the trailer and the vehicle about a coupling point.

2. The system of claim 1, further including a vehicle steering system, wherein:
   the controller further controls the steering system of the vehicle using the hitch angle in a kinematic model of the vehicle in combination with the trailer to maintain the vehicle along a backing path.

3. The system of claim 2, wherein the backing path corresponds with a user-commanded curvature of the vehicle in combination with the trailer.

4. The system of claim 1, wherein the radar system includes a first radar unit and a second radar unit respectively mounted on a right side and a left side of a rear of the vehicle.

5. The system of claim 4, wherein the controller:
   receives the object point location data from the first and second radar units;
   establishes locations of object points in the object point location data within first and second coordinate systems associated respectively with the first and second radar units; and
   further processes the object point location data to transform the locations of the object points in the object point location data within both the first and second coordinate systems into locations of the object points within a third coordinate system aligned with a hitch ball of the vehicle.

6. The system of claim 5, wherein the object point location data are stored respectively in the sequential first and second object point location data sets within the third coordinate system.

7. The system of claim 5, wherein:
   the first and second coordinate systems are polar arrays; and
   the third coordinate system is a Cartesian grid and is aligned with the hitch ball of the vehicle by placing an origin of the Cartesian grid at a location that corresponds with a position of the hitch ball of the vehicle relative to the first and second radar units.

8. The system of claim 1, wherein:
   the first instance is selected to correspond with straight, forward movement of the vehicle; and
   the second instance is selected to correspond with reversing movement of the vehicle.

9. The system of claim 8, wherein the controller:
continues to receive the object point location data and to store additional sequential object point location data sets in a continuous manner during a continued reversing movement of the vehicle to continuously output the determined hitch angle between the trailer and the vehicle about the coupling point; and
uses an estimation filter to smooth variations in successive values in a continuous output of at least one of the estimated rotational angle and the determined hitch angle.

10. The system of claim 8, wherein the controller further:
designates the second object point location data set as a reference set at a predetermined interval angle;
continues to receive the object point location data and stores a sequential third object point location data set;
applies the rotational point set registration to the first and third object point location data sets to achieve a match between a subset of persistent point locations within the first and third object point location data sets, within the predetermined range, to output a subsequent estimated rotational angle between the first and third object point location data sets;
applies the rotational point set registration to the third object point location data sets to achieve a match between a subset of persistent point locations within the second and third object point location data sets, within the predetermined range, to output a shifted estimated rotation angle between the second and third object point location data sets; and
if the subsequent estimated rotational angle and the shifted estimated rotational angle have an absolute difference within a predetermined limit, uses an estimation filter to output the hitch angle further based on the subsequent estimated rotational angle and the shifted estimated rotational angle.

11. The system of claim 1, wherein ones of the point locations determined to not be persistent points within the first and second object point location data sets are considered false-positive point locations not corresponding with detected points on the trailer.

12. The system of claim 1, wherein the controller limits the object point location data stored in the sequential first and second object point location data sets to a subset of the object point location data within a predetermined radial distance from the coupling point.

13. The system of claim 1, wherein the error in matching between the persistent point locations in the first and second object point location data sets is minimized by solving a constrained problem for the persistent point locations that returns the determined hitch angle.

14. A method for determining an angle between a connected trailer and a vehicle, comprising:
receiving object point location data to a rear of the vehicle output by a radar system of the vehicle;
storing sequential first and second object point location data sets by processing the object point location data from the radar system at an increased sensitivity level relative to use of the data for vehicle detection at separate first and second instances;
applying a rotational point set registration to the first and second object point location data sets to achieve a match between a subset of persistent point locations within the first and second object point location data sets, within a predetermined range, to output an estimated rotation angle between the first and second object point location data sets, the persistent point locations in the first and second object point location data sets are determined to correspond with detected points on the connected trailer; and
refining the estimated rotation angle by minimizing an error in matching between the persistent point locations in the first and second object point location data sets to output a determined hitch angle between the connected trailer and the vehicle about a coupling point.

15. The method of claim 14, wherein the object point location data is received from first and second radar units respectively mounted on a right side and a left side of a rear of the vehicle, the method further including:
establishing locations of points in the object point location data within first and second coordinate systems associated respectively with the first and second radar units;
further processing the object point location data to transform the locations of the points in the object point location data within both the first and second coordinate systems into locations of the points within a third coordinate system aligned with a hitch ball of the vehicle; and
respectively storing the object point location data in the sequential first and second object point location data sets according to the third coordinate system.

16. The method of claim 14, wherein:
the first instance is selected to correspond with straight, forward movement of the vehicle; and
the second instance is selected to correspond with reversing movement of the vehicle.

17. The method of claim 16, further including continuing to receive the object point location data and to store additional sequential object point location data sets in a continuous manner during a continued reversing movement of the vehicle to continuously output the determined hitch angle between the trailer and the vehicle about the coupling point.

18. The method of claim 14, wherein point locations determined to not be persistent points within the first and second object point location data sets are considered false-positive point locations not corresponding with detected points on the trailer.

19. The method of claim 14, wherein the object point location data stored in the sequential first and second object point location data sets are limited to a subset of the object point location data within a predetermined radial distance from the coupling point.

20. A vehicle, comprising:
a radar system outputting object point location data to a rear of the vehicle; and
a controller:
receiving the object point location data and storing sequential first and second object point location data sets by processing the object point location data from the radar system at an increased sensitivity level relative to use of the data for vehicle detection at separate first and second instances;
applying a rotational point set registration to the second object point location data sets to achieve a match between a subset of persistent point locations within the first and second object point location data sets, within a predetermined range, to output an estimated rotation angle between the first and second object point location data sets, the persistent point locations in the first and second object point location data sets being determined to correspond with detected points on a trailer coupled with the vehicle; and
refining the estimated rotation angle by minimizing an error in matching between the persistent point locations in the first and second object point location data sets to output a determined hitch angle between the trailer and the vehicle about a coupling point.

* * * * *